Patented July 22, 1924.

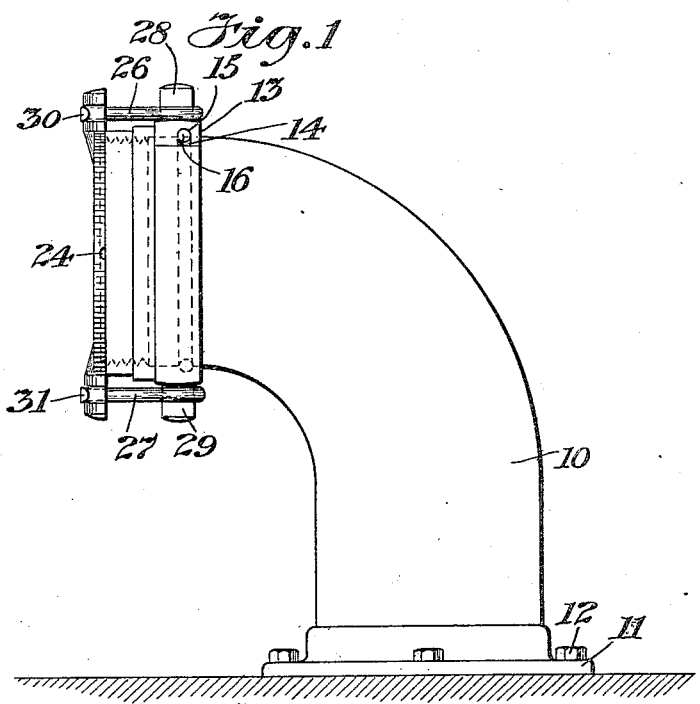
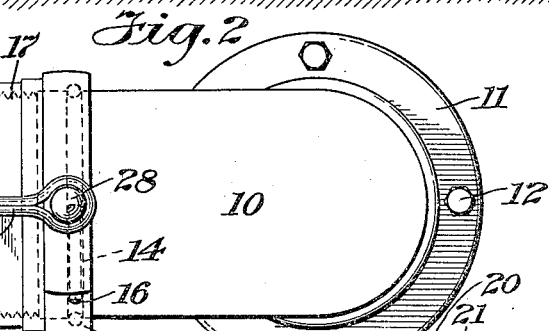
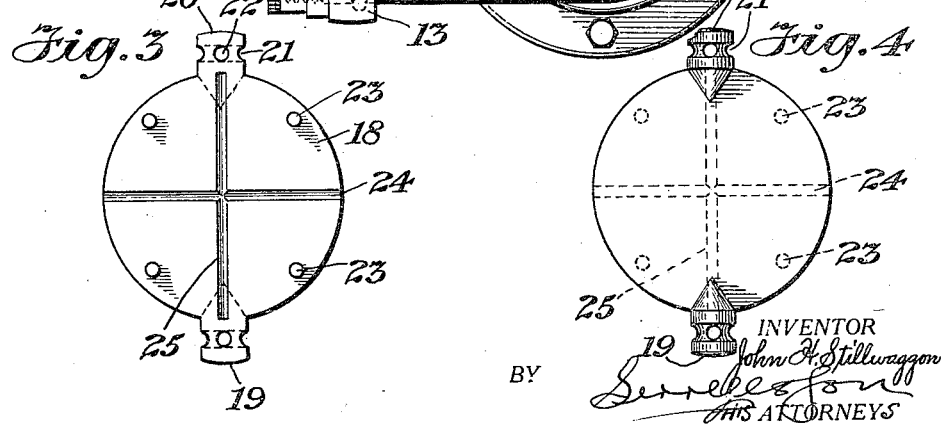

1,502,444

UNITED STATES PATENT OFFICE.

JOHN H. STILLWAGGON, OF RICHMOND HILL, NEW YORK.

STANDPIPE CAP.

Application filed April 18, 1922. Serial No. 554,688.

*To all whom it may concern:*

Be it known that I, JOHN H. STILLWAGGON, a citizen of the United States, residing at Richmond Hill, in the borough and county of Queens, city and State of New York, have invented an Improvement in Standpipe Caps, of which the following is a specification.

This invention relates to stand pipe caps. The stand pipe or pipes upon which these caps are adapted for use are those ordinarily employed as the terminals of fire pipe lines for buildings or other places and are commonly placed at the side of a building or in a walk adjacent the same so as to be readily accessible for the attachment thereto of suitable hose in cases when it is necessary to remove the cap and attach the hose for supplying water to the pipe line in extinguishing fires. I am aware that heretofore various forms of closure caps for pipe line terminals have been made. These terminals, however, are of different diameters and the ordinary form of cap is designed to fit each diameter of the swivel coupling end of the stand pipe. Moreover these caps, as commonly constructed, are provided with lugs connected thereto by screws or otherwise and adapted thus to engage the trunnions on the swivel member of the stand pipe to secure the cap in place. This unnecessarily increases the labor of connecting and disconnecting the cap, except of course in cases where the cap is removed for the connection of a hose thereto by being broken as is customary, and even in such instances there is oftentimes considerable difficulty experienced in the removal of the cap.

The object of my invention is to overcome these difficulties by employing the stand pipe cap so constructed as to be fitted to the swivel coupling member of a stand pipe when made of different diameters, and also one which is readily connected and disconnected to the stand pipe and which when broken for the purpose of connecting a hose is readily removable so that no time is lost in the attachment of the hose because of difficulty to remove the cap.

The stand pipe cap made in accordance with my present invention will be hereinafter more particularly described in conjunction with the accompanying drawings, in which,—

Fig. 1 is a side elevation of a stand pipe fitted with the improved removable cap.

Fig. 2 is a plan of the same.

Fig. 3 is a plan of the inner face of the cap, and

Fig. 4 is a plan of the outer face of the cap.

Referring particularly to the drawing, a stand pipe is indicated at 10. In this illustration I have shown a stand pipe having but one outlet, although it is customary, at least in some instances, to employ stand pipes with twin or double outlets, and in either construction it is also customary to fit these stand pipes with a back pressure valve, although of course this is no part of my invention and is not illustrated in the drawing. As shown, however, the base of the stand pipe is fitted with a flange 11 and connected to a wall or floor or walk by suitable bolts 12. As is customary the stand pipe at its outer end is fitted with a swivel coupling connection 13. This connection is mounted to turn on the end of the stand pipe by being connected thereto in any desired manner. As illustrated, however, the end of the stand pipe is fitted with a circumferential recess 14 and the inner face of the swivel connection with a similar recess 15 and a wire 16 is passed through an opening provided in the swivel connection for this purpose and caused to lie within the recess in order to connect the swivel member to the stand pipe in such a manner that the same will readily turn thereon. As is also customary the swivel connection 13 is tapped or interiorly screw threaded, as indicated at 17, to receive a screw threaded nozzle or other attachment provided at the end of a hose.

The cap construction to which the present invention more particularly relates consists of a plate 18 preferably circular and of relatively thin cast metal having oppositely disposed lugs 19 and 20. In each of these lugs 19 and 20 there is provided a recess 21 and a transverse hole 22. Secured to the plate and extending therefrom in suitably spaced positions are a plurality of pins 23 employed to center the plate in placing the same in position on the open end of the swivel connection 13. Also as clearly indicated in Figs. 3 and 4 of the drawing, the inner face of the plate is preferably provided with grooves 24 and 25 in order to weaken the structure to make the same more readily breakable.

The cap, as heretofore described, is preferably secured in position on the end of the swivel connection by cotter pins indicated at 26 and 27. The eye in each of these cotter pins is of a sufficient diameter to fit over the customary trunnions 28 and 29 provided in oppositely disposed positions on the swivel connection 13, and the holes 22 in the lugs 19 and 20 are of the necessary diameter to permit the ends of the cotter pins to be threaded therethrough so that the extremities of the cotter pins, as indicated at 30 and 31, may be turned down into the recesses or grooves 21 provided for this purpose in the lugs 19 and 20.

It will now be apparent that a cap made in accordance with this invention to fit the swivel connection of stand pipes of the largest diameter customarily employed will be equally applicable for use on stand pipes of smaller diameter inasmuch as the eyes of the cotter pins, as will be understood, may assume any position on the trunnions of the swivel connection. It will furthermore be understood that when the cap is broken by the use of a hammer or wrench or similar tool the parts for connecting the plate in position are readily removed from the swivel connection and will not interfere with the attachment of the hose thereto.

I claim as my invention:

1. In a standpipe and in combination with the swivel end connection thereof which is provided with oppositely disposed trunnions, a cover plate, lugs in oppositely disposed positions on the cover plate, each lug having a groove therein, and cotter pins each adapted to fit over one of the trunnions on the swivel end connection to pass through the corresponding lug and to be turned down in the said groove therein to secure the said plate in position, the said plate having a weakened section whereby it is easily broken and when broken the end of the standpipe being adapted to be automatically uncovered.

2. In a stand pipe and in combination with the swivel end connection thereof, a plate of relatively thin material, means for centering the plate in position at the end of a swivel connection, lugs in oppositely disposed positions on the said plate, each lug having a hole therethrough and a groove therein, and cotter pins adapted to fit over the trunnions of the swivel connection and to pass through the holes in the said lugs and to be turned down in the grooves therein to secure the plate in place, the said plate having weakened sections whereby it is easily broken and when broken the parts thereof being adapted to automatically fall away to uncover the end of the standpipe.

3. In a stand pipe and in combination with the swivel end connection thereof, a plate of relatively thin material, the said plate having a plurality of transversely placed grooves in its inner face, a plurality of pins extending from the inner face of the plate for centering the same in the swivel connection, lugs in oppositely disposed positions on the said plate, each lug having a hole therethrough and a groove therein, and cotter pins adapted to fit over the trunnions of the swivel connection and to pass through the holes in the said lugs and to be turned down in the grooves therein to secure the plate in place.

Signed by me this 20th day of March, 1922.

JOHN H. STILLWAGGON.